(12) United States Patent
Wang (10) Patent No.: US 8,289,983 B2
(45) Date of Patent: Oct. 16, 2012

(54) IMPLEMENTING METHOD OF REMOVING DUPLICATION PROTECTION FOR MULTIMEDIA MESSAGING SERVICE INTERWORKING FORWARDING MESSAGE AND MULTIMEDIA MESSAGING SERVICE INTERWORKING GATEWAY THEREOF

(75) Inventor: Yongyin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/054,794

(22) PCT Filed: Aug. 7, 2009

(86) PCT No.: PCT/CN2009/000901
§ 371 (c)(1),
(2), (4) Date: Jan. 19, 2011

(87) PCT Pub. No.: WO2010/017691
PCT Pub. Date: Feb. 18, 2010

(65) Prior Publication Data
US 2011/0122882 A1    May 26, 2011

(30) Foreign Application Priority Data
Aug. 14, 2008  (CN) .......................... 2008 1 0142493

(51) Int. Cl.
*H04L 12/56* (2006.01)
*H04J 1/16* (2006.01)
(52) U.S. Cl. .................... 370/401; 370/282; 370/428
(58) Field of Classification Search .............. 370/401, 370/282, 428
See application file for complete search history.

(56) References Cited

U.S. PATENT DOCUMENTS

| | | | | |
|---|---|---|---|---|
| 2003/0225873 | A1* | 12/2003 | Wade | 709/223 |
| 2004/0039789 | A1* | 2/2004 | Jackson et al. | 709/217 |
| 2005/0198161 | A1* | 9/2005 | Rooke et al. | 709/206 |
| 2006/0258331 | A1* | 11/2006 | Syrett et al. | 455/405 |
| 2007/0088848 | A1* | 4/2007 | Chen et al. | 709/238 |
| 2007/0156909 | A1* | 7/2007 | Osborn et al. | 709/227 |
| 2007/0239737 | A1* | 10/2007 | Dudley et al. | 707/10 |
| 2007/0271348 | A1* | 11/2007 | Yang | 709/206 |
| 2008/0043763 | A1* | 2/2008 | Johnson et al. | 370/401 |

(Continued)

FOREIGN PATENT DOCUMENTS

CN  101005646 A  7/2007

(Continued)

OTHER PUBLICATIONS

Notification of the First Office Action of Chinese application No. 200810142493.7, issued on Sep. 2, 2010.

(Continued)

*Primary Examiner* — John Pezzlo
(74) *Attorney, Agent, or Firm* — Oppedahl Patent Law Firm LLC (57) ABSTRACT

An implementing method for removing duplication protection for multimedia messaging service interworking forwarding message and multimedia messaging service interworking gateway. The method determines whether to return response message according to the different value of the acknowledgement request field of the request signaling. Using the SMTP-interactive-status code as a criterion, when the acknowledgement request field is set to be "NO", requesting not to return the response message, and when the acknowledgement request field is set to be "YES", requesting to return the response message. Determine whether the forwarding is successful by determining whether the SMTP-sending-status code returned by the response signaling is received according to the replying status of the response signaling.

10 Claims, 4 Drawing Sheets

U.S. PATENT DOCUMENTS

2008/0287111 A1 * 11/2008 Zabawskyj et al. ........ 455/414.1

FOREIGN PATENT DOCUMENTS

| CN | 101202944 A | 6/2008 |
|---|---|---|
| CN | 101340634 A | 1/2009 |
| KR | 20070077716 A | 7/2007 |
| RU | 2271615 C2 | 3/2006 |
| RU | 2323527 C2 | 4/2008 |

OTHER PUBLICATIONS

International Search Report on international application No. PCT/CN2009/000901, mailed on Nov. 19, 2009.

English Translation of the Written Opinion of the International Search Authority in international application No. PCT/CN2009/000901, mailed on Nov. 19, 2009.

* cited by examiner

FIG. 1

PRIOR ART

IMPLEMENTING METHOD OF REMOVING DUPLICATION PROTECTION FOR MULTIMEDIA MESSAGING SERVICE INTERWORKING FORWARDING MESSAGE AND MULTIMEDIA MESSAGING SERVICE INTERWORKING GATEWAY THEREOF

TECHNICAL FIELD

The present invention relates to the field of the Multimedia Messaging Service (MMS) interworking of telecommunication industry, particularly to an implementing method for removing duplication protection via an interworking gateway though which forwarding messages are received and according to the returned forwarding response status, and a multimedia messaging service interworking gateway.

BACKGROUND

At present, China Mobile, China Unicom and other operators have set up MMSC (Multimedia Messaging Service Center) and realized MMS function on the platform. So far, the MMSC is one of the SMS (Short Message Service) technologies with the highest development level, of which the greatest feature is support to multimedia function. The MMSC may transmit video clips, pictures, sound and words in virtue of high speed transmission technology EDGE (Enhanced Data rates for GSM Evolution) and GPRS (General Packet Radio Service) by using WAP as a carrier. Not only the multimedia transmission can be implemented between mobile phones, but the multimedia transmission can also be implemented between mobile phones and computers. In order to implement the interworking of Multimedia Messaging Service (MMS) among different operators, according to the requirements of interconnection subcommittee of ministry of industry and information technology on implementing the MMS interworking, China Mobile, China Unicom and other operators need to set up dedicated Multimedia Messaging Service Interworking Gateway (MMSIG) to support MMS interworking.

During implementing of interworking, as the interworking gateway between two operators lacks a synchronous mechanism in determining of message sending status, causing a same message to be sent repeatedly, and making user experience reduced.

Figure 1:
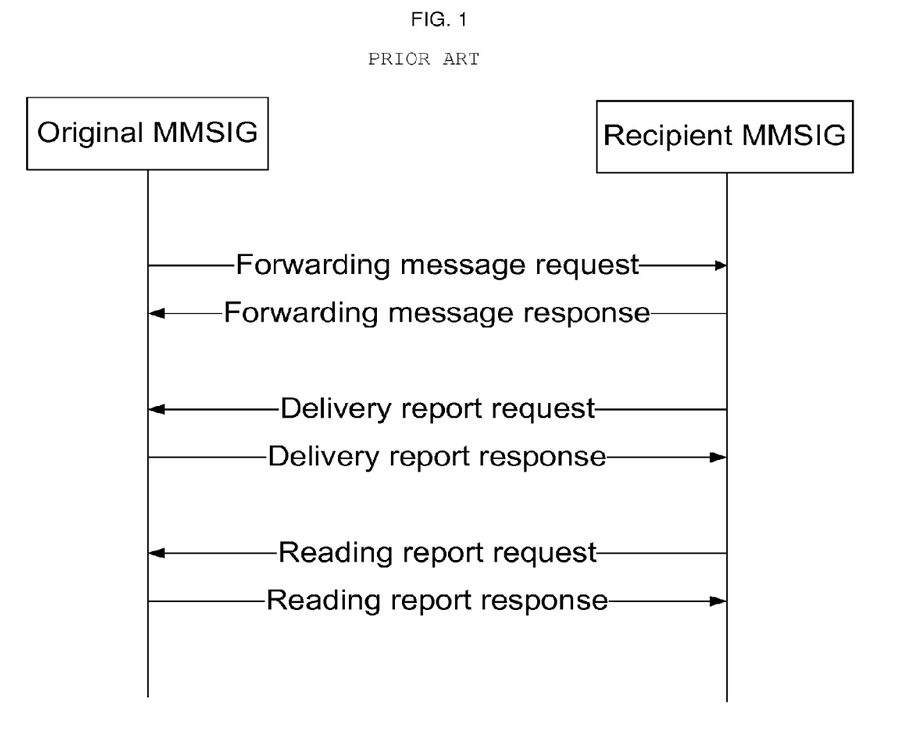
FIG. 1 is a flow chart of interworking in the prior art.

For a sender, after receiving a feedback message, it needs to wait for the next reply signaling before reporting of completing forwarding, as shown in FIG. 1. Due to different links, message caching is also needed. When time is out and there is no forwarding message response signaling, the cached content is resent, the success rate of the sending will be low and long delays may occur in some flows; while for a receiver, after replying the feedback message, it may not forward the message at once until forwarding message response signaling is successfully replied. If the forwarding message response signaling fails to be sent, the forwarding message request signaling will be discarded. If it is not discarded, the message status of the two MMSIGs will become inconsistent: the original MMSIG will consider the sending of the message fails, whereas the recipient MMSIG in fact has succeeded in the reception. As a result, this message will be sent multiple times, and the original user will be billed repeatedly, affecting the user experience and causing complaint. Therefore, the method in the prior art needs to be improved.

SUMMARY

The object of the present invention is to address the defect of the prior art by providing operators with a method for reducing the repeated sending and repeated billing during the MMS interworking, and in order to remove duplication protection for MMS interworking forwarding message, during transmitting messages on a single-link and double-link, the specific SMTP-interactive-status code is taken as a criterion.

The technical solution of the present invention is as follows:

An implementing method of removing duplication protection for MMS interworking forwarding message, includes the following steps:

A. the original MMSIG sends information to the recipient MMSIG at the opposite end. The information is a forwarding message request;

B. the recipient MMSIG determines a transmission type of a link according to a setting status of the request signaling of the original MMSIG, and determines whether the message is successfully received according to the status-identification-code fed back by the request signaling or a response signaling. If successfully received, then go to step C; if not successfully received, then return to step A; and C. delivering the normally received information to an MMSC.

In the method, when the recipient MMSIG determines the original MMSIG transmits information on a single link, the recipient MMSIG may determine receiving a status of the information according to the status-identification code fed back by the request signaling.

Further, in the single-link transmitting information mode, an acknowledgement request field in the request signaling may be set to be "NO", requesting not to return the response signaling, and using the SMTP-interactive-status code of the request signaling as status feedback of message processing.

In the method, the SMTP-interactive-status code may be "250 OK".

In the method, when the request signaling of the original MMSIG and the response signaling of the recipient MMSIG are transmitted on double links, the recipient MMSIG may determine receiving status of the information according to the status-identification code fed back by the response signaling.

Further, in the double-link transmission mode, an acknowledgement request field in the request signaling may be set to be "YES", requesting to return the response signaling, and using the SMTP-interactive-status code of the response signaling as the status feedback of message processing.

In the method, the interactive-status code of the response signaling may be "250 OK".

A system of removing duplication protection for MMS interworking forwarding message, wherein the system comprises an original MMSIG and a recipient MMSIG, and corresponding MMSCs; the original MMSIG and the recipient MMSIG are connected to their corresponding MMSCs respectively. The original MMSIG is used to send information to the recipient MMSIG at an opposite end, wherein the information is a forwarding message request; the recipient MMSIG is used to determine the transmission type of the link of the original MMSIG according to the setting status of the request signaling of the original MMSIG, and to determine whether the information is successfully received according to the status-identification code fed back by the signaling, and to deliver the normally received message to the corresponding MMSC.

In the system, it may further comprise user terminals. The user terminals are connected to the corresponding MMSCs and used to determine according to the SMTP-interactive-status code fed back by the users whether the users have successfully read the information delivered by the MMSC.

An MMSIG, for removing duplication protection for MMS interworking forwarding message, may be respectively used as an originator or a receiver to connect with MMSC. The MMSIG is set as follows:

When the MMSIG is an originator, it sets the status of request signaling and sends information to the opposite MMSIG as a receiver. The information is a forwarding message request. Thereby, the opposite MMSIG as the receiver determines a transmission type of the link of the MMSIG according to the setting status of the request signaling and determines according to the status-identification code fed back by the request signaling or the response signaling whether the information is successfully received. If successfully received, the normally received information will be delivered to the MMSC; and When the MMSIG is a receiver, it receives the information sent by the opposite MMSIG as an originator. The information is a forwarding message request. The MMSIG determines the transmission type of the link of the opposite MMSIG as an originator according to the setting status of the request signaling of the opposite MMSIG as the originator and determines according to a status-identification code fed back by the request signaling or the response signaling whether the information is successfully received. If successfully received, the normally received information will be delivered to the MMSC.

A method, system and MMSIG of removing the duplication protection for MMS interworking forwarding message are provided by the present invention. The method, system and MMSIG implement information transmission on different links according to the different value of the acknowledgement request field "Acknowledgement Request" of the request signaling using SMTP-interactive-status code as a criterion, to realize the low consuming of system resource, almost no delay and a high success rate of transmitting, and to avoid the problem of user dissatisfaction about repeated retry caused by exception reception of response message at the sending end; meanwhile, when an interworking gateway initiatively originates a forwarding message, the present invention optimizes the request flow and avoids repeated transmission caused by status inconsistency on multiple links.

DETAILED DESCRIPTION

The present invention provides an implementing method and system of removing the duplication protection for MMS interworking forwarding message. To make the objects, technical solutions and advantages of the present invention more evident and definite, the present invention will be further described in details in conjunction with the following drawings and embodiments.

Figure 2:
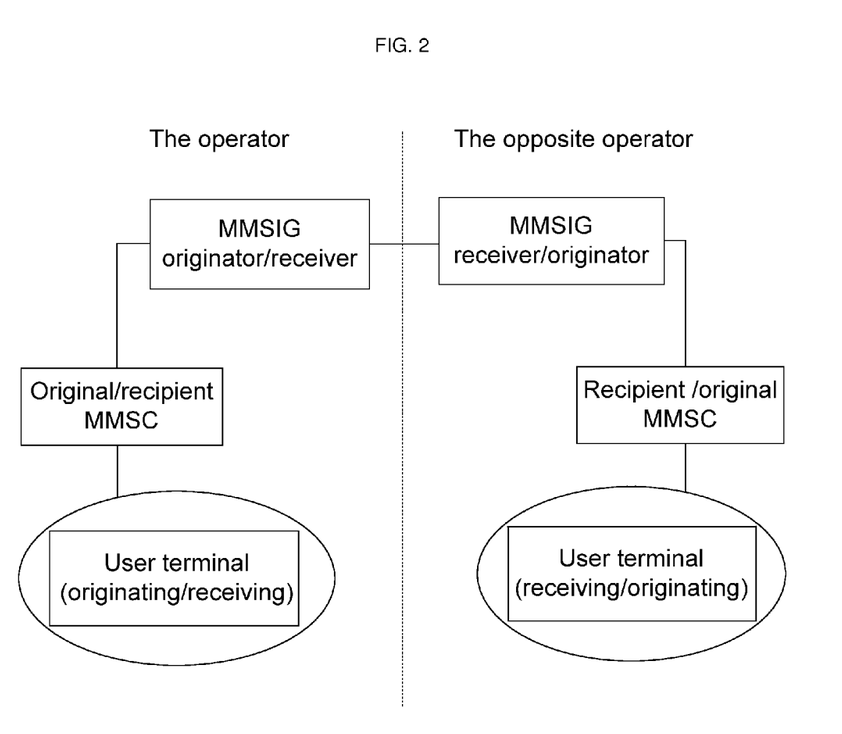
FIG. 2 is a schematic diagram illustrating the system architecture of the present invention.

In order to solve the problem of transmission delay and low transmission success rate caused by the inconsistency between original MMSIG and recipient MMSIG at the opposite end during MMS interworking, the present invention adopts a system and method of synchronous control to optimize conventional message flow, the core of which is to determine whether to return response message according to the different value of the acknowledgement request field "Acknowledgement Request" in the request signaling. When the acknowledgement request field is set to be "NO", it requests not to return the response message and uses the SMTP-interactive-status code as a criterion; when the acknowledgement request field is set to be "YES", it requests to return the response message, and determines whether the returned SMTP-sending-status code is received according to the replying status of response signaling, if received then the forwarding is successful, so as to complete the normal service processing and continue the forwarding. As shown in FIG. 2, the system comprises a Multimedia Messaging Service Center (MMSC), an original Multimedia Messaging Service Interworking Gateway (MMSIG) and a recipient Multimedia Messaging Service Interworking Gateway (MMSIG) as well as user terminals. The original MMSIG and the recipient MMSIG respectively connects their corresponding MMSC. The original MMSIG sends information to the recipient MMSIG at the opposite end. The information is a forwarding message request. The recipient MMSIG determines the transmission type of the originating link according to the setting status of the request signaling of the original MMSIG. Wherein when the value of the request field in the request signaling of the original MMSIG is set to be "NO", it is a single-link transmission and requests not to return response signaling and uses the SMTP-interactive-status code of the request signaling as a status feedback of message processing; when the value of the request field in the request signaling is set to be "YES", it is a double-link transmission (i.e. the request signaling and the response signaling are not on the same TCP link, each sets up a link and each signaling has a status code "250 OK"), requesting to return response signaling, and determines whether the receiving and sending are successful according to the SMTP-sending-status code of the response signaling and delivers the normally received message to the MMSC. The user terminals (including receiving/originating and originating/receiving user terminals) connects to their corresponding MMSC respectively, to be used for determining whether the users have successfully read the information delivered by the MMSC according to the SMTP-interactive-status code fed back by the users.

Figure 3:
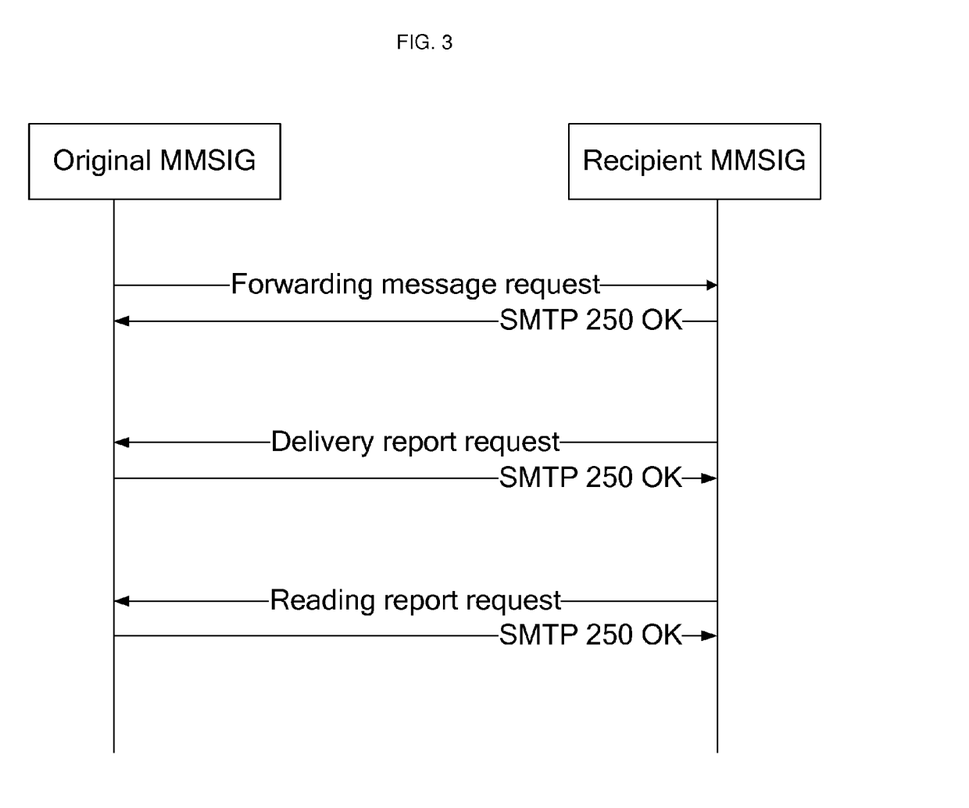
FIG. 3 is a flow chart of the interworking without the need of returning response in the request of the present invention.

According to the system, the method adopted by the present invention mainly include: the first step, as an original Multimedia Messaging Service Interworking Gateway (original MMSIG), through setting the field "Acknowledgement Request" in a request signaling message to be "NO", it requests not to return response message and uses the SMTP-interactive-status code of the request signaling as the status feedback of message processing. "250 OK" means success of sending, while "non 250-OK" means failure of sending, and whether to activate a retry of the sending will be decided according to the type of the error code. As the sending is on the same link, when the request signaling is sent out, there will instantly be an interactive-status code as the status feedback of message processing. Whether the sending is successful is determined based on the reception of this interactive-status code, so as to achieve the intention of no delay and timely transmitting. In conjunction with FIG. 3, the steps of the present invention are described. In FIG. 3, the value of the forwarding acknowledgement request field "Acknowledgement Request" in the request signaling message of MM port is set to be "NO", requesting not to return response message. Its flow is as follows:

step 1: an original MMSIG sends a forwarding message request to an recipient MMSIG at the opposite end;

step 2: the recipient MMSIG receives the forwarding message request and uses the SMTP-interactive-status code of the forwarding message request as the status feedback of message processing. "250 OK" means success of sending. The message status will be switched over to the status for waiting a delivery report, and the multimedia message will be normally delivered to the recipient MMSC. If what received is "non 250-OK", it means failure of sending, whether to activate retry of sending is determined according to the type of the error code, and returns to step 1;

step 3: the forwarding message request being successfully sent, the recipient MMSIG sends a delivery report request to the original MMSIG and the SMTP-interactive-status code of the delivery report request is used as status feedback of message processing. "250 OK" means success of sending, and the multimedia message will be delivered to the original MMSC. If what received is "non 250-OK", it means failure of sending, and whether to activate retry of sending will be decided according to the type of the error code;

step 4: after the delivery report is successfully sent, the recipient MMSIG sends a reading report request to the original MMSIG, and determines the returned SMTP-interactive-status code according to whether the user has read the reading report request or not. "250 OK" means success of sending, and the message will be sent to the MMSC finally, to report that the user has successfully read this reading report. "Non 250-OK" means failure of sending, and whether to activate retry of sending will be decided according to the type of the error code.

In FIG. 3, at MM4 port there are three groups of signaling, including forwarding message, delivery report and reading report. The three groups of signaling have the same flow and message transmission situation. The delivery report and the reading report have the same control mechanism with that of the forwarding message request signaling, but the directions are reverse; in this embodiment, the values of the acknowledgement request field of the three groups of signaling are set to be "NO", but it needs to be compatible with a plurality of realization methods within the range permitted by standards, i.e. adapt to the case when the value of acknowledgement request field is set to be "YES". Therefore, here different formats of the original requests must be properly adapted, and the problem of repeated sending should be solved; the present invention suggests the original MMSIG adopting the way of not requesting the acknowledgement request.

Figure 4:
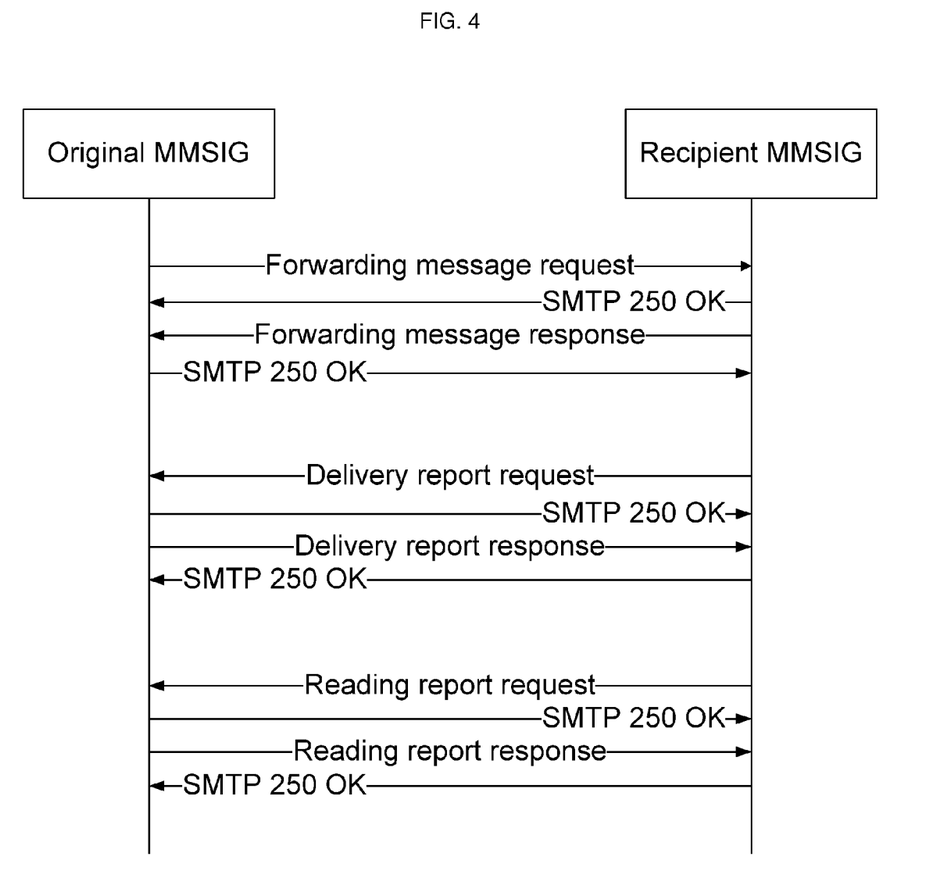
FIG. 4 is a flow chart of the interworking with the need of returning response in the request of the present invention.

The second step: as a recipient MMSIG, it determines message status respectively according to whether the original MMSIG requests response feedback. For a message not requesting a response feedback, i.e. the value of the message field "Acknowledgement Request" of the request signaling is set to be "NO", the information will be transmitted on the same link. When the request signaling is sent out, an SMTP-interactive-status code is used as a status feedback of message processing, if the message is received normally, SMTP "250 OK" will be returned and the multimedia message will be delivered normally to MMSC, as described in FIG. 3; if a message requests response feedback, i.e. the value of the field "Acknowledgement Request" in the request signaling message is set to be "YES", the transmitted information will be transmitted on different links and be processed according to the SMTP-sending-status code of the response feedback. "250 OK" means success of sending, and "non 250-OK" will be deemed as failure of sending. If the sending fails, the original request message will be discarded. If the sending succeeds, the request will be delivered to follow-up flow. As the two pieces of signaling are not on the same TCP link, each signaling per se has "250 OK" meaning for completion (many kinds of status codes, 250 stands for success, 421, 553 and so on stand for failure). This "250 OK" is on the same TCP link with the request signaling or the response signaling. When interactive-status code SMTP "250 OK" fed back by response signaling is received, it means the sending is successful. In this way, both the problem of repeated reception of terminal users and the problem of repeated billing of the sending users are solved. In conjunction with FIG. 4, the steps of needing return of response in the present invention are described. In FIG. 4, the value of the response fields "Acknowledgement Request" of the three groups of signaling-forwarding message, delivery report and reading report are set to be "YES", signaling in each group is double link transmitted information, including REQ (request) and RES (response). In other words, when a request is sent, response shall be returned. In the three groups of signaling-forwarding message, delivery report and reading report, the RES message is optional signaling other than compulsory signaling. Below is its flow:

step 1: the original MMSIG sends a forwarding message request to the recipient MMSIG at opposite end;

step 2: the original MMSIG requests the recipient MMSIG to return the forwarding message. After the recipient MMSIG receives the forwarding message request, it will determine the replying status of the forwarding message response, confirm that the original MMSIG receives the forwarding message response and returns successful status "250 OK" at the same time. Then the message status is switched to a waiting status for a delivery report, while the recipient MMSIG performs normal service processing, and delivers this multimedia message to the MMSC and continues forwarding. If the sending of forwarding message response fails, or the originator receives "non 250-OK" and deems the sending fails, the receiver will discard the original forwarding message, waiting for the originator retrying and returning to step 1;

step 3: the forwarding message request being successfully sent, the recipient MMSIG sends a delivery report request to the original MMSIG, the original MMSIG determines the replying status of the delivery report response, and confirms that the recipient MMSIG receives the delivery report response message and returns successful status code "250 OK" at the same time, and deliver the multimedia message to the MMSC. If the sending of the delivery report response fails or "non 250-OK" is received, the sending will be deemed failed, and the original MMSIG will discard the original delivery report and wait for the resending of the recipient MMSIG;

step 4: after the delivery report is successfully sent, the recipient MMSIG sends a reading report request to the original MMSIG. The recipient MMSIG determines replying status of reading report response, confirms that the recipient MMSIG receives response message of the delivery report and returns "250 OK" at the same time as success status feedback of message processing. "250 OK" means success of sending. In the end, the message will be sent to the MMSC. If the sending of reading report response fails or "non 250-OK" is received, deeming that the sending fails, the original MMSIG will discard the original reading report, and wait for retry of the recipient MMSIG.

Below the present invention is further described based on the message flows in conjunction with FIG. 3 and FIG. 4:

(i) IO (Interworking Gateway Originated) Flow

Taking a pair of signaling MM4_forward.REQ/MM4_forward.RES (forwarding message request/forwarding message response) for example, in order to avoid failing message due to network reason when the other side returns forwarding message response, the original MMSIG should minimize the inconsistency of message status resulting from transmission on different links and try to achieve the goal of sending messages on one link. Therefore, no return is requested for optional message MM4_forward.RES (forwarding message response) through setting the "Acknowledgement Request" in MM4_forward.REQ (forwarding message request) signaling to be "NO". According to this principle, during the SMTP protocol interactive process of sending MM4_forward.REQ (forwarding message request) signaling, the message sending status is determined based on the status code returned by the recipient MMSIG at opposite end. If "250 OK" is returned, it means success of sending, and the message status will be switched over to the waiting status of delivery report. If 4XX or 5XX status code is returned, whether to retry will be determined based on the error code situation. The messages needing retry will be inserted into the retry queue to wait for the next retry. For a message not needing retry, a failure bill and termination log will be issued directly and the message flow will be terminated.

Through adjusting the value of the field within the range permitted by standards, the problem of synchronic status of MM4 forwarding message under SMTP protocol is effectively improved. As an original MMSIG, it may definitely request not to return MM4_forward.RES message, and determine message forwarding status according to the SMTP-interactive-status code of MM4_forward.REQ instead; but as a recipient MMSIG, it must be compatible with different circumstances of whether the original MMSIG requests MM4_forward.RES or not. In view of the above analytical process, the original MMSIG is suggested to adopt the mode of not requesting MM4_forward.RES. The processing flow of the delivery report and the reading report are similar with that of the forwarding message. The detailed flow is shown in FIG. 3, single-link transmission is adopted, for the originator, receiving SMTP "250 OK" means completion of forwarding, so there is no need to wait for RES message, as the transmission is completed on the same link, the message dose not need to be cached and the forwarding flow is terminated. Therefore, there is almost no transmission delay; for the receiver, as replying SMTP "250 OK" means completion of reception, follow-up forwarding and other processing may be started and no interaction with the original MMSIG is needed. As there is no caching, and no need to consider arithmetic of hit ratio. The processing is simplified and efficient, and there is no delay during transmission by and large.

(ii) IT (Interworking Gateway Terminated) Flow

According to the analysis on the above IO flow, it is suggested to adopt the message interaction process of not requesting to return MM4_forward.RES. Anyway, it is a suggestion only. As the recipient MMSIG, it must be compatible with a plurality of realization methods within the range permitted by standards. Therefore, here different formats of requests from the originator must be properly adapted, and the problem of repeated sending should be solved. Taking a pair of signaling MM4_forward.REQ/MM4_forward.RES for example, to ensure the message not being processed repeatedly, when MM4_forward.REQ message is received, firstly the value of acknowledgement request field of the signaling MM4_forward.REQ will be determined, and then it will be processed respectively according to the different value:

1. If the value is set to be "NO", then no need to return MM4_forward.RES message is needed.

This circumstance tallies with the foregoing suggested mode and is also most reliable and effective. Status code is returned according to the reception condition of MM4_forward.REQ message. "250 OK" is returned if normal, and 4XX or 5XX error code is returned if exception. The original MMSIG will regard this status code as a sign of whether the forwarding is successful. Therefore, for a message which returns successful status code "250 OK", the recipient MMSIG will carry out service processing directly and continue to forward the message; for a message which returns exception error code, the recipient MMSIG will discard this message, and the opposite original MMSIG will control whether to retry. This control mode does not have the problem of repeated forwarding and repeated billing. The message flow is shown in FIG. 3.

2. If the value is set to be "YES", MM4_forward.RES message needs to be returned. The details are shown in FIG. 4. In this case, the original MMSIG will request to return MM4_forward.RES response message, and regard the reception of MM4_forward.RES as a sign of successful forwarding. Therefore, the recipient MMSIG must determine the replying status of MM4_forward.RES and confirm this message is successfully received by the recipient MMSIG at opposite end before the initiation of further processing flow. If it is confirmed that the original MMSIG has received MM4_forward.RES message and returned successful status"250 OK", the recipient MMSIG will initiate normal service processing and continue the forwarding. If the sending of MM4_forward.RES message fails or the receiving of the original MMSIG fails, the recipient MMSIG will discard the original MM4_forward.REQ message, and wait for retry of the original MMSIG.

According to the descriptions above, the implementing method for removing duplication protection is introduced from two perspectives of both originator and receiver. This method achieves the effect of removing duplication protection in a simple and effective manner. As proved by practice, it is a practical and feasible method.

It should be noted that the above embodiments are intended to illustrate the technical solution of the present invention only and not to limit the present invention. Although the present invention is described in details by referring to preferred embodiments, those skilled in the art should understand all modifications or identical replacements of the technical solution of the present invention made without departing from the spirit and range of the technical solution of the present invention shall be within the claims of the present invention.

INDUSTRIAL APPLICABILITY

A method and system for implementing removing duplication protection for MMS interworking forwarding message is provided by the present invention. According to different value of acknowledgement request field "Acknowledgement Request" of the request signaling and through using SMTP-interactive-status code as a criterion, information transmission on different links with low system depletion is implemented, almost no delay and high transmission success rate, avoiding the problem of user dissatisfaction about repeated retry caused by the exception reception of response message of the originator; meanwhile when an interworking gateway initiatively originates a forwarding message, it can optimize request flow and avoid repeated transmission caused by status inconsistency of a plurality of links.

What is claimed is:

1. A method for use in forwarding of a multimedia messaging service (MMS) message from a first multimedia messaging service interworking gateway (MMSIG) to a second MMSIG, the method comprising the steps of:

at the first MMSIG, requesting a simple message transfer protocol (SMTP) session with the second MMSIG by means of a transmission control protocol (TCP) connection;

at the second MMSIG, establishing the SMTP session with the first MMSIG by means of the TCP connection;

at the first MMSIG, sending a forwarding message request in which an acknowledgment request field is set to be "NO";

at the second MMSIG, sending to the first MMSIG an SMTP-interactive-status code indicative of successful receipt of the forwarding message request, and not sending any other forwarding message response to the first MMSIG, wherein the SMTP-interactive-status code indicative of successful receipt of the forwarding message request is "250 OK", and the forwarding message request contains the MMS message.

2. A method for use in forwarding of a multimedia messaging service (MMS) message from a first multimedia messaging service interworking gateway (MMSIG) to a second MMSIG, the method comprising the steps of:

at the first MMSIG, requesting a simple message transfer protocol (SMTP) session with the second MMSIG by means of a transmission control protocol (TCP) connection;

at the second MMSIG, establishing the SMTP session with the first MMSIG by means of the TCP connection;

at the first MMSIG, sending a forwarding message request in which an acknowledgment request field is set to be "NO";

at the second MMSIG, sending to the first MMSIG an SMTP-interactive-status code not indicative of successful receipt of action upon the forwarding message request;

at the first MMSIG, in response to the SMTP-interactive-status code not indicative of successful receipt of the forwarding message request, repeating an attempt to forward the MMS message, wherein the SMTP-interactive-status code not indicative of successful receipt of the forwarding message request comprises a message beginning with "4" or "5", and the forwarding message request contains the MMS message.

3. A method for use by a first multimedia messaging service interworking gateway (MMSIG) in forwarding of a multimedia messaging service (MMS) message to a second MMSIG, the method comprising the steps of:

at the first MMSIG, requesting a simple message transfer protocol (SMTP) session with the second MMSIG by means of a transmission control protocol (TCP) connection;

at the first MMSIG, receiving from the second MMSIG an establishment of the SMTP session with the first MMSIG by means of the TCP connection;

at the first MMSIG, sending a forwarding message request in which an acknowledgment request field is set to be "NO";

at the first MMSIG, receiving by means of the TCP connection an SMTP-interactive-status code indicative of successful receipt of the forwarding message request;

at the first MMSIG, avoiding any attempted resending of the MMS message in response to the receipt of the SMTP-interactive-status code indicative of successful receipt of the forwarding message request, and not in response to any other forwarding message response, wherein the SMTP-interactive-status code indicative of successful receipt of the forwarding message request comprises "250 OK", and the forwarding message request contains the MMS message.

4. A method for use by a first multimedia messaging service interworking gateway (MMSIG) in forwarding of a multimedia messaging service (MMS) message to a second MMSIG, the method comprising the steps of:

at the first MMSIG, requesting a simple message transfer protocol (SMTP) session with the second MMSIG by means of a transmission control protocol (TCP) connection;

at the first MMSIG, receiving from the second MMSIG an establishment of the SMTP session with the first MMSIG by means of the TCP connection;

at the first MMSIG, sending a forwarding message request in which an acknowledgment request field is set to be "NO";

at the first MMSIG, receiving by means of the TCP connection an SMTP-interactive-status code not indicative of successful receipt of the forwarding message request;

at the first MMSIG, attempting a resending of the MMS message in response to the receipt of the SMTP-interactive-status code not indicative of successful receipt of the forwarding message request, and not in response to the absence of any other forwarding message response, wherein the SMTP-interactive-status code not indicative of successful receipt of the forwarding message request comprises a code beginning with "4" or "5", and the forwarding message request contains the MMS message.

5. A method for use by a second multimedia messaging service interworking gateway (MMSIG) in receiving a multimedia messaging service (MMS) message from a first MMSIG, the method comprising the steps of:

at the second MMSIG, receiving a request for a simple message transfer protocol (SMTP) session from the first MMSIG by means of a transmission control protocol (TCP) connection;

at the second MMSIG, sending to the first MMSIG an establishment of the SMTP session with the second MMSIG by means of the TCP connection;

at the second MMSIG, receiving a forwarding message request in which an acknowledgment request field is set to be "NO";

at the second MMSIG, sending by means of the TCP connection an SMTP-interactive-status code indicative of successful receipt of the forwarding message request and not sending any other forwarding message response, wherein the SMTP-interactive-status code indicative of successful receipt of the forwarding message request comprises "250 OK", and the forwarding message request contains the MMS message.

6. A system comprising a first multimedia messaging service interworking gateway (MMSIG) and a second MMSIG, the first MMSIG disposed, in response to receipt of multimedia messaging service (MMS) message, to request a simple message transfer protocol (SMTP) session with the second MMSIG by means of a transmission control protocol (TCP) connection;

the second MMSIG disposed, in response to a request for an SMTP session by means of a TCP connection, to establish the SMTP session with the first MMSIG by means of the TCP connection;

the first MMSIG disposed, in response to establishment of the SMTP session by means of the TCP connection, to send a forwarding message request in which an acknowledgment request field is set to be "NO";

the second MMSIG disposed, upon successful receipt of the forwarding message request, to send to the first MMSIG an SMTP-interactive-status code indicative of successful receipt of the forwarding message request, and not to send any other forwarding message response to the first MMSIG, wherein the SMTP-interactive-status code indicative of successful receipt of the forwarding message request is "250 OK", and the forwarding message request contains the MMS message.

7. A system comprising a first multimedia messaging service interworking gateway (MMSIG) and a second MMSIG, the first MMSIG disposed, in response to receipt of multimedia messaging service (MMS) message, to request a simple message transfer protocol (SMTP) session with the second MMSIG by means of a transmission control protocol (TCP) connection;

the second MMSIG disposed, in response to a request for an SMTP session by means of a TCP connection, to establish the SMTP session with the first MMSIG by means of the TCP connection;

the first MMSIG disposed, in response to establishment of the SMTP session by means of the TCP connection, to send a forwarding message request in which an acknowledgment request field is set to be "NO";

the second MMSIG disposed, upon a lack of successful receipt of the forwarding message request, to send to the first MMSIG an SMTP-interactive-status code not indicative of successful receipt of the forwarding message request, and not to send any other forwarding message response to the first MMSIG;

the first MMSIG disposed, upon receipt of the SMTP-interactive-status code not indicative of successful receipt of the forwarding message request, to repeat an attempt to forward the MMS message, wherein the SMTP-interactive-status code not indicative of successful receipt of the forwarding message request comprises a message beginning with "4" or "5", and the forwarding message request contains the MMS message.

8. A first multimedia messaging service interworking gateway (MMSIG), the first MMSIG disposed, in response to a multimedia messaging service (MMS) message to be forwarded to a second MMSIG, to request a simple message transfer protocol (SMTP) session with the second MMSIG by means of a transmission control protocol (TCP) connection;

the first MMSIG disposed, upon receipt from the second MMSIG of an establishment of the SMTP session with the first MMSIG by means of the TCP connection, to send a forwarding message request in which an acknowledgment request field is set to be "NO";

the first MMSIG disposed, upon receipt by means of the TCP connection an SMTP-interactive-status code indicative of successful receipt of the forwarding message request, to avoid any attempted resending of the MMS message in response to the receipt of the SMTP-interactive-status code indicative of successful receipt of the forwarding message request, and not in response to any other forwarding message response, wherein the SMTP-interactive-status code indicative of successful receipt of the forwarding message request comprises "250 OK", and the forwarding message request contains the MMS message.

9. A first multimedia messaging service interworking gateway (MMSIG) characterized with respect to a second MMSIG, the first MMSIG disposed, in response to a multimedia messaging service (MMS) message to be forwarded to the second MMSIG, to request a simple message transfer protocol (SMTP) session with the second MMSIG by means of a transmission control protocol (TCP) connection;

the first MMSIG disposed, upon receipt from the second MMSIG of an establishment of the SMTP session with the first MMSIG by means of the TCP connection, to send a forwarding message request in which an acknowledgment request field is set to be "NO";

the first MMSIG disposed, upon receipt by means of the TCP connection an SMTP-interactive-status code not indicative of successful receipt of the forwarding message request, to attempt resending of the MMS message in response to the receipt of the SMTP-interactive-status code not indicative of successful receipt of the forwarding message request, and not in response to any other forwarding message response, wherein the SMTP-interactive-status code not indicative of successful receipt of the forwarding message request comprises a code beginning with "4" or "5", and the forwarding message request contains the MMS message.

10. A second multimedia messaging service interworking gateway (MMSIG) characterized with respect to a first MMSIG having a multimedia messaging service (MMS) message, the second MMSIG disposed, upon receipt of a request for a simple message transfer protocol (SMTP) session from the first MMSIG by means of a transmission control protocol (TCP) connection to send to the first MMSIG an establishment of the SMTP session with the second MMSIG by means of the TCP connection;

the second MMSIG disposed, upon successfully receipt of the forwarding message request, to send by means of the TCP connection an SMTP-interactive-status code indicative of successful receipt of the forwarding message request and not to send any other forwarding message response, wherein the SMTP-interactive-status code indicative of successful receipt of the forwarding message request comprises "250 OK", and the forwarding message request contains the MMS message.

* * * * *